(12) United States Patent
Nakamura et al.

(10) Patent No.: US 7,993,045 B2
(45) Date of Patent: Aug. 9, 2011

(54) VEHICULAR HEADLAMP

(75) Inventors: Hiromi Nakamura, Shizuoka (JP); Hironori Tsukamoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 328 days.

(21) Appl. No.: 12/401,991

(22) Filed: Mar. 11, 2009

(65) Prior Publication Data

US 2009/0231876 A1 Sep. 17, 2009

(30) Foreign Application Priority Data

Mar. 13, 2008 (JP) ................ 2008-064033
Oct. 10, 2008 (JP) ................ 2008-264329

(51) Int. Cl.
*B60Q 1/00* (2006.01)
(52) U.S. Cl. ............ 362/545; 362/464; 315/77
(58) Field of Classification Search .......... 362/545, 362/464, 540, 465, 543, 544, 85, 276, 800; 315/77, 79, 81, 82, 291
See application file for complete search history.

(56) References Cited

U.S. PATENT DOCUMENTS

| 7,116,052 B2 * | 10/2006 | Ito et al. ............ 315/77 |
| 7,173,375 B2 * | 2/2007 | Takeda et al. ....... 315/77 |
| 7,237,935 B2 * | 7/2007 | Ito et al. ............ 362/547 |
| 7,318,662 B2 * | 1/2008 | Takeda et al. ....... 362/475 |
| 7,758,218 B2 * | 7/2010 | Mochizuki et al. .. 362/465 |
| 2004/0178737 A1 * | 9/2004 | Takeda et al. ....... 315/77 |
| 2004/0179366 A1 * | 9/2004 | Takeda et al. ....... 362/464 |
| 2004/0179368 A1 | 9/2004 | Takeda et al. |
| 2006/0139942 A1 * | 6/2006 | Pond et al. ......... 362/545 |
| 2006/0274544 A1 | 12/2006 | Inoue et al. |
| 2008/0007961 A1 * | 1/2008 | Mochizuki et al. .. 362/465 |

FOREIGN PATENT DOCUMENTS

| DE | 101 03 702 A1 | 8/2002 |
| DE | 10 2004 047682 A1 | 4/2006 |
| EP | 1 145 904 A2 | 10/2001 |
| EP | 1 491 399 A2 | 12/2004 |
| EP | 1 637 397 A1 | 3/2006 |
| JP | 2002-324418 A | 11/2002 |
| JP | 2006-236588 A | 9/2006 |

OTHER PUBLICATIONS

European Extended Search Report, Application No. 09154979, Jun. 9, 2010, 8 pages.

* cited by examiner

*Primary Examiner* — Bao Q Truong
(74) *Attorney, Agent, or Firm* — Sughrue Mion, PLLC

(57) ABSTRACT

A vehicular headlamp is provided. The vehicular headlamp includes a headlamp which emits light; an indication lamp comprising semiconductor light-emitting elements as light sources; and an electric circuit which supplies a current to the indication lamp. The indication lamp is divided into at least two light source sections comprising respective sets of light sources, and at least one of the light source sections is disposed in a high-temperature region whose temperature is made higher than in a remainder of the light source sections while the headlamp unit is lit. The electric circuit controls the light source sections individually so that a current supplied to the light source section disposed in the high-temperature region is made smaller than a current supplied to the remainder of the light source sections.

14 Claims, 8 Drawing Sheets

VEHICULAR HEADLAMP

TECHNICAL FIELD

Devices and apparatuses consistent with the present invention relate to vehicular headlamps and, more particularly, to vehicular headlamps which protect against heat.

RELATED ART

A related art combination vehicular headlamp incorporates a headlamp unit and an indication lamp unit. Examples of the indication lamp unit are a clearance lamp unit which functions as a side marker lamp, a turn signal lamp unit which functions as a turn signal lamp, and a daytime running lamp unit which exercises an indication function when lit in a period other than night.

JP-A-2006-236588 describes a related art combination vehicular headlamp in which a headlamp unit and an indication lamp unit are arranged vertically in close proximity to each other.

JP-A-2002-324418 describes a related art combination vehicular headlamp in which a headlamp unit occupies a front portion of a vehicle and an indication lamp unit occupies a front corner portion (i.e., a portion bridging the front portion and a side portion) of the vehicle.

The above-described related art combination vehicular headlamps have a few disadvantages. For example, when light-emitting diodes (LEDs) are used as light sources of the indication lamp unit, the light sources of the indication lamp unit are affected by heat generated in the headlamp unit.

Thus, the related art combination vehicular headlamp in which the headlamp unit and the indication lamp unit are arranged in close proximity to each other, the LEDs of the indication lamp unit are affected by heat generated in the headlamp unit and the life of those LEDs is shortened.

Moreover, depending on the geometry of the vehicular headlamp, it can be difficult to dispose a heat sink to attempt to reduce the effect of the heat on the light sources. Thus, in the related art combination vehicular headlamp in which the indication lamp unit occupies the narrow front corner portion, there is a disadvantage in that it is not possible to reduce the degree of influence of heat on the light sources and the life of the LEDs is shortened.

Furthermore, where the indication lamp unit has multiple LEDs which are arranged vertically, some of the LEDs are more affected by heat than others. This inconsistency creates uneven wear for the light sources, and therefore the life of those LEDs is shortened.

SUMMARY

Illustrative aspects of the present invention provide a vehicular headlamp which can protect the light sources of an indication lamp unit of the vehicular headlamp.

According to an exemplary embodiment of the present invention, there is provided a vehicular headlamp comprising a headlamp unit which emits light; an indication lamp unit comprising a plurality of semiconductor light-emitting elements as light sources; and an electric circuit which supplies a current to at least the indication lamp unit. The indication lamp unit is divided into at least two light source sections comprising respective sets of light sources, and at least one of the light source sections is disposed in a high-temperature region whose temperature is made higher than in a remainder of the at least two light source sections while the headlamp unit is lit, and the electric circuit controls the at least two light source sections individually so that a current supplied to the light source section disposed in the high-temperature region is made smaller than a current supplied to the remainder of the at least two light source sections.

Additional aspects may be apparent from the following detailed description, the accompanying drawings and the claims.

DETAILED DESCRIPTION

A vehicular headlamp according to a first exemplary embodiment of the present invention will be hereinafter described with reference to FIGS. 1-4.

Figure 1:
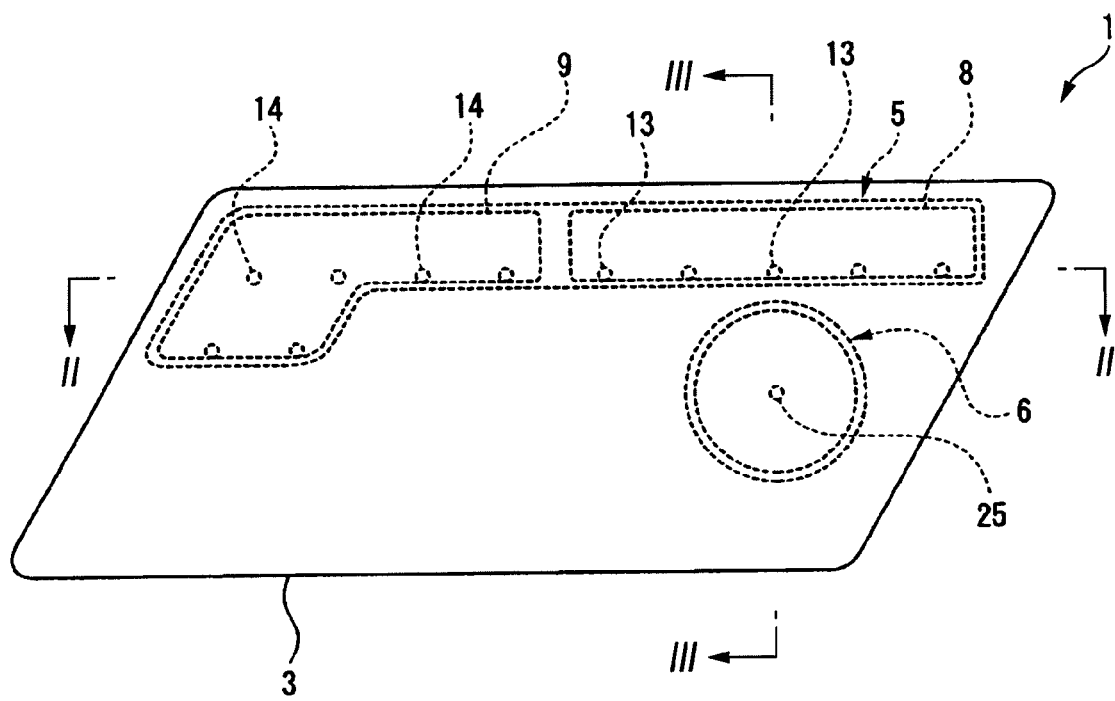
FIG. 1 is a schematic front view of a vehicular headlamp according to a first exemplary embodiment of the present invention.

Typically, two vehicular headlamps 1 are attached to the front portion of a vehicle at right and left end positions, respectively. FIG. 1 shows the vehicular headlamp 1 provided at the right side when viewed from the front of the vehicle.

Figure 2:
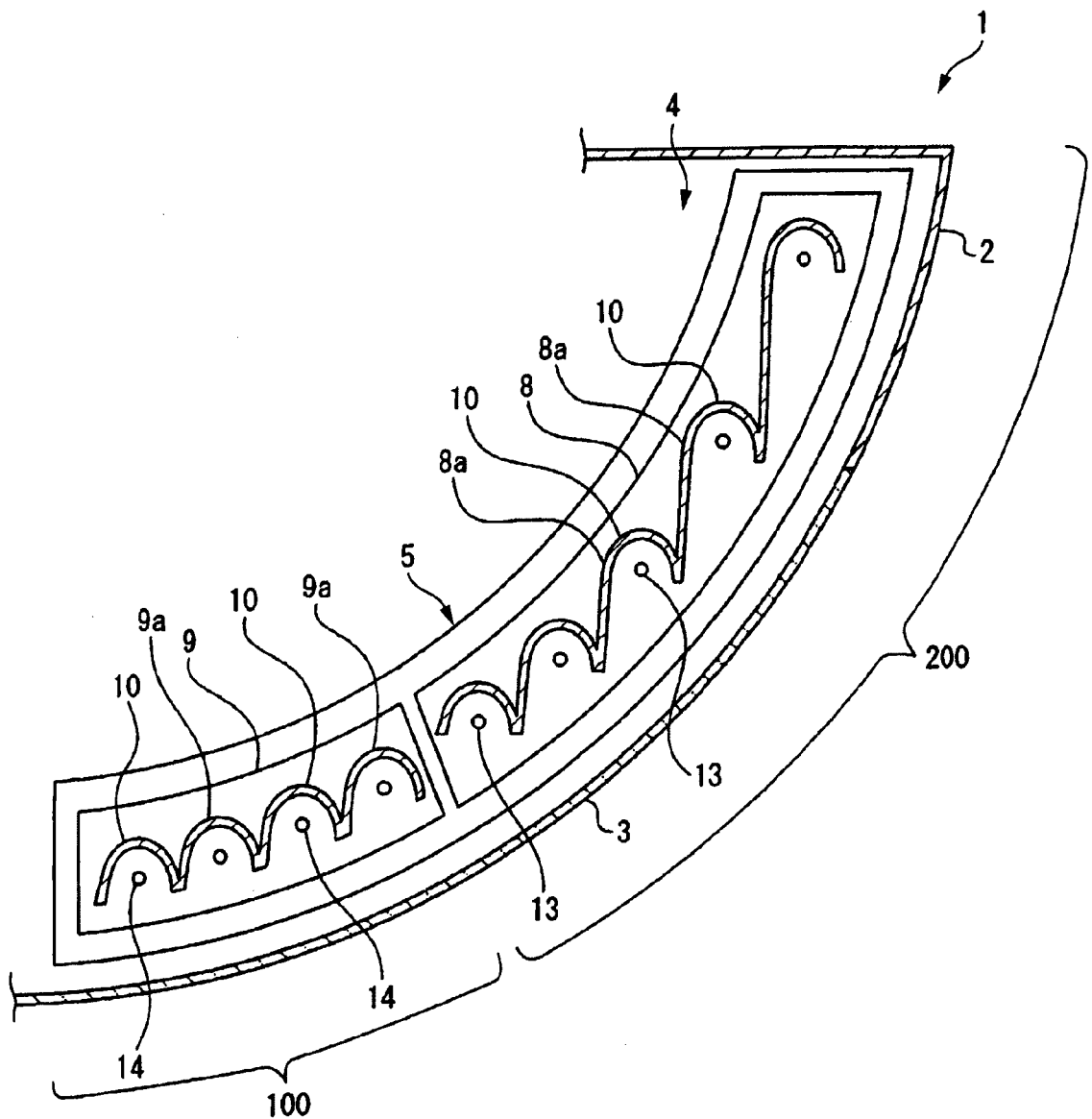
FIG. 2 is a sectional view of the vehicular headlamp, taken along line II-II in FIG. 1.
Figure 3:
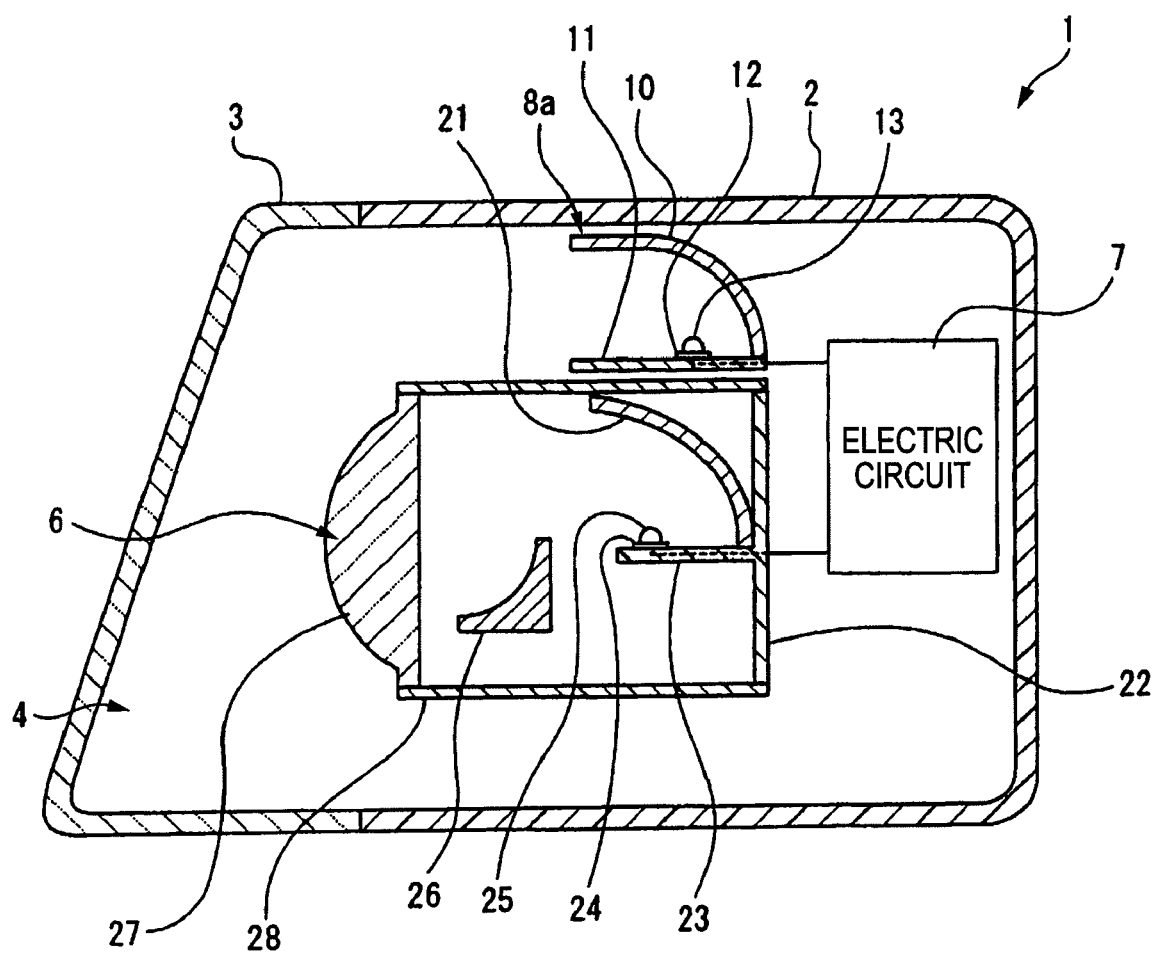
FIG. 3 is a sectional view of the vehicular headlamp, taken along line III-III in FIG. 1.

As shown in FIGS. 1-3, each vehicular headlamp 1 has a lamp body 2 having a recess that is open on the front side and a cover 3 which closes the opening of the lamp body 2. The internal space formed by the lamp body 2 and the cover 3 is a lamp chamber 4.

As shown in FIGS. 1-3, an indication lamp unit 5 which occupies a front portion 100 and a corner portion 200 of the vehicle, a headlamp unit 6 which is disposed on the side of the corner portion 200, and an electric circuit 7 for supplying currents to the indication lamp unit 5 and the headlamp unit 6, respectively, are provided in the lamp chamber 4.

For example, the indication lamp unit 5 maybe a daytime running lamp which exercises an indication function when lit in a period other than night (i.e., from around dawn to around sunset), and has a plurality of light source units including, for example, a first light source unit 8 and a second light source unit 9.

In general, to enhance the visibility from outside the vehicle, the indication lamp unit occupies a front corner portion of the vehicle. In particular, where the indication lamp unit 5 is used as a daytime running lamp unit, it is advantageous from the viewpoint of visibility enhancement, etc. that the indication lamp unit 5 have an oblong shape and occupy a front corner portion.

The indication lamp unit 5 is not limited to a daytime running lamp and may alternatively be a clearance lamp, a turn signal lamp, or other indication lamps.

As shown in FIGS. 1 and 2, the first light source unit 8 occupies the corner portion 200 of the vehicle and is disposed above in close proximity to the headlamp unit 6. For example, as shown in FIG. 2, the first light source unit 8 has a plurality of first lamp units 8a. As shown in FIG. 3, each first lamp unit 8a is provided with a reflector 10 which is open on the front side, a horizontal substrate mounting member 11 which is attached to the rear end of the reflector 10, a substrate 12 which is mounted on the substrate attachment member 11, and a semiconductor light-emitting element 13 which is mounted on the substrate 12. The semiconductor light-emitting element 13 may be an LED. The reflectors 10 of the first lamp units 8a are adjacent to and integral with each other.

As shown in FIG. 2, the second light source unit 9 occupies the front portion 100 and is disposed beside the first light source unit 8. For example, the second light source unit 9 has a plurality of second lamp units 9a. The structure of each second lamp unit 9a is approximately the same as that of each first lamp unit 8a and hence will not be described in detail. As shown in FIGS. 1 and 2, each second lamp unit 9a has, as a light source, a semiconductor light-emitting element 14 which has the same function as the semiconductor light-emitting element 13 of each first lamp unit 8a. The semiconductor light-emitting element 14 may also be an LED. The second light source unit 9 is provided with a heat sink (not shown) for dissipating heat that is generated while light is emitted from the LEDs 14.

Although FIG. 1 shows an example in which the first light source unit 8 is provided with five first lamp units 8a and the second light source unit 9 is provided with six second lamp units 9a, the numbers of first lamp units 8a and second lamp units 9a are not limited to these numbers; at least one first lamp unit 8a and one second lamp unit 9a should be provided.

As shown in FIG. 3, the headlamp unit 6 is provided with a reflector 21 which is open on the front side, a bracket 22 which is supported by a frame (not shown) so as to be rotatable horizontally, a substrate 24 which is mounted on the bracket 22, a semiconductor light-emitting element 25 which is mounted on the substrate 24, a shade 26 which controls the light quantity, a projection lens 27 for projecting light forward that is emitted from the semiconductor light-emitting element 25, and a lens holder 28 which holds the projection lens 27. The semiconductor light-emitting element 25 may also be an LED. Although the example of FIGS. 1 and 3 is provided with only one LED 25, plural LEDs 25 may be provided.

The bracket 22 is provided with a horizontal substrate mounting member 23 and the substrate 24 is mounted on the substrate mounting member 23.

The electric circuit 7 is coupled to the LED 13 and LED 14 of the indication lamp unit 5, and to the LED 25 of the headlamp unit 6.

Figure 4:
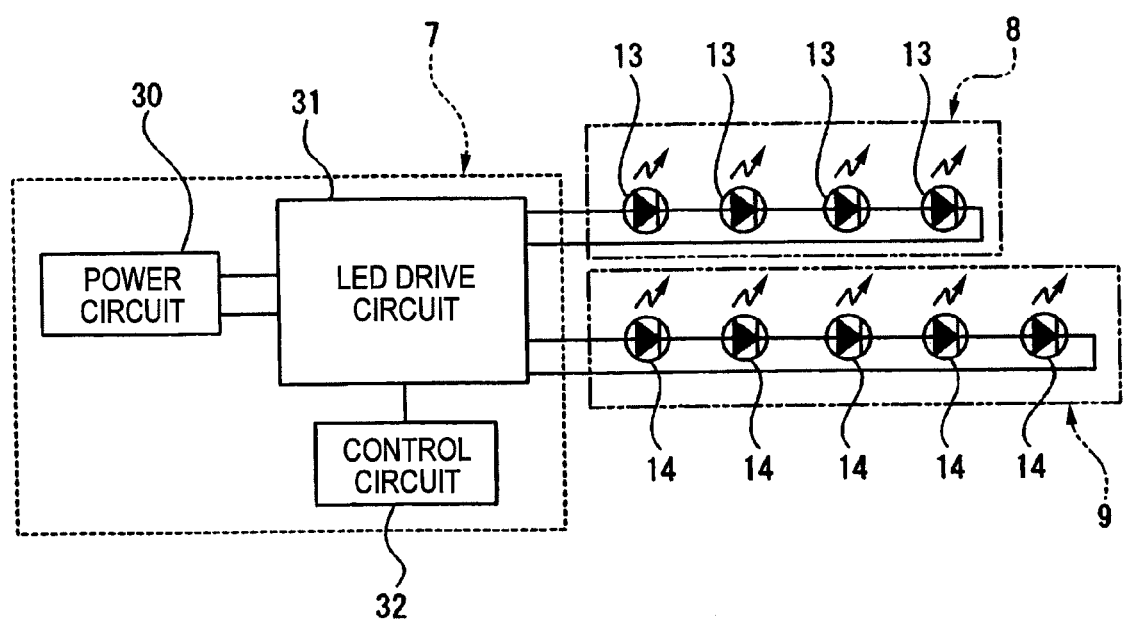
FIG. 4 is a schematic view illustrating control of current supply to LEDs.

As shown in FIG. 4, the LEDs 13 are coupled to each other in series and a constant current flows through the LEDs 13. Likewise, the LEDs 14 are coupled to each other in series and a constant current flows through the LEDs 14.

As shown in FIG. 4, the electric circuit 7 is equipped with a power circuit 30, an LED drive circuit 31, and a control circuit 32.

The LED drive circuit 31, which is a switching regulator, includes a transformer, capacitors, diodes, and negative channel metal-oxide-semiconductor (NMOS) transistors. The LED drive circuit 31 functions as a current supply for supplying currents to the LEDs 13, 14, and 25 while receiving DC power from the power circuit 30.

The control circuit 32 that controls the LED drive circuit 31 will be described below.

The control circuit 32 controls the LED drive circuit 31 so that the current (hereinafter referred to as "first current") flowing through the LEDs 13 is made smaller than the current (hereinafter referred to as "second current") flowing through the LEDs 14. That is, by controlling the LED drive circuit 31 the control circuit 32 controls the first light source unit 8 and the second light source unit 9 individually.

The first light source unit 8 of the indication lamp unit 5 is disposed in close proximity to the headlamp unit 6, and accordingly is more prone to be affected by heat generated in the headlamp unit 6 than the second light source unit 9 is. Therefore, the region occupied by the first light source unit 8 is a high-temperature region where the temperature is made higher than in the other region.

However, in the vehicular head lamp 1, since the control circuit 32 controls the LED drive circuit 31 so that the first current flowing through each LED 13 is made smaller than the second current flowing through each LED 14, the degree of influence of heat generated in the headlamp unit 6 on the first light source unit 8 can be lowered and the durability of the LED 13 disposed in close proximity to the headlamp unit 6 can thus be increased.

Since the first light source unit 8 of the indication lamp unit 5 occupies the corner portion 200 having a small space, it is difficult to incorporate a heat dissipation member such as a heat sink for dissipating heat that is generated in the first light source unit 8. Hence, the first light source unit 8 is prone to be affected by heat generated in the headlamp unit 6.

However, in the vehicular headlamp 1, since the control circuit 32 performs control so that the first current flowing through each of the LEDs 13 disposed in the corner portion 200 of the vehicle is made smaller than the second current flowing through each LED 14, the durability of the LEDs 13 which are disposed in the corner portion 200 can be increased.

Where the indication lamp unit 5 is a daytime running lamp, it is rare that the indication lamp unit 5 and the headlamp unit 6 are lit simultaneously. However, immediately after turning-off of the indication lamp unit 5, the LEDs 13 of the indication lamp unit 5 are high in temperature and hence are prone to be affected by heat generated in the headlamp unit 6.

Where the indication lamp unit 5 is a turn signal lamp or a position lamp, unlike in the case of a daytime running lamp, the indication lamp unit 5 may be lit together with the headlamp unit 6. In such a situation, the LEDs 13 of the indication lamp unit 5 are high in temperature and hence are prone to be affected by heat generated in the headlamp unit 6.

However, in the vehicular headlamp 1, since control is made so that the first current flowing through each of the LEDs 13 of the indication lamp unit 5 (daytime running lamp, turn signal lamp, or position lamp) is made smaller than the second current flowing through each LED 14, the degree of influence of heat generated in the headlamp unit 6 on the indication lamp unit 5 can be lowered.

Where the indication lamp unit 5 is a daytime running lamp which exercises an indication function when lit in a period other than night, the life of the indication lamp unit 5 (daytime running lamp) can be lengthened when the daytime running lamp is lit continuously and at a high frequency in a period other than night.

In the above description, the corner portion 200 was described as a space where it is difficult to dispose a heat dissipation member such as a heat sink. However, the region where it is difficult to secure a sufficient space is not limited to the corner portion 200. That is, the influence of heat can be reduced by performing the above-described current control in the case where there is a high-temperature region where it is difficult to secure a sufficient space because of the manner of arrangement of lamp units and a light source unit that is prone to be affected by heat generated in the headlamp unit is disposed in the high-temperature region.

Next, a description will be made of how the control unit 32 performs control in the event of, for example, an abnormality of line disconnection in the indication lamp unit 5.

If an abnormality in which a line is disconnected occurs in either the first light source unit 8 or the second light source unit 9, the indication lamp unit 5 may no longer function properly, and thus a prescribed light intensity distribution or brightness cannot be obtained. Additionally, the case may arise in which only the LEDs 13 in the first light source unit 8 are lit and power is consumed wastefully.

In the vehicular headlamp 1, if an abnormality in which a line is disconnected occurs in one of the first light source unit 8 and the second light source unit 9, the control circuit 32 performs control so as to stop the current supply to all the LEDs 13 and 14 of the indication lamp unit 5.

More specifically, a current detector (not shown) for detecting a current flowing through the LEDs 13 and a current flowing through the LEDs 14 is provided. When a line is disconnected in either the first light source unit 8 or the second light source unit 9, the current detector outputs an abnormality detection signal. When receiving the abnormality detection signal from the current detector, the control circuit 32 controls the LED drive circuit 31 so that the current supply to all the LEDs 13 and 14 is stopped.

Therefore, even if an abnormality in which a line is disconnected occurs in either the first light source unit 8 or the second light source unit 9, the current supply to all the LEDs 13 and is stopped and a waste of power consumption can be prevented.

Although an abnormality in which a line is disconnected is described above, the current may also be stopped in the event of other abnormalities including the short-circuiting of an anode-cathode, an anode ground fault, a cathode ground fault of an LED, or the like.

Although in the above described exemplary embodiment the light source units of the indication lamp unit 5 is divided into two parts, the number of divisional parts of the light source unit is not limited to two and may be three or more.

A vehicular headlamp according to a second exemplary embodiment of the present invention will be hereinafter described with reference to FIGS. 5-8.

Two vehicular headlamps 40 are attached to the front portion of a vehicle at right and left end positions, respectively.

Figure 5:
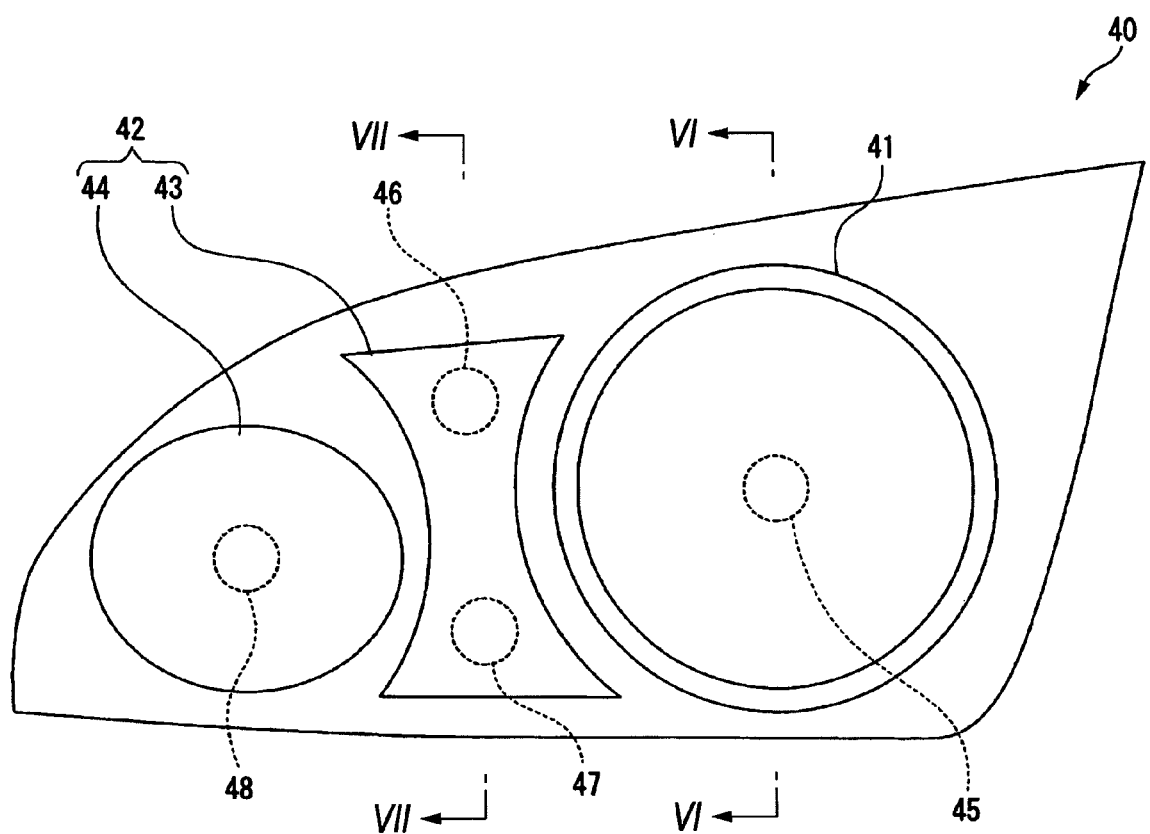
FIG. 5 is a schematic front view of a vehicular headlamp according to a second exemplary embodiment of the present invention.
Figure 6:
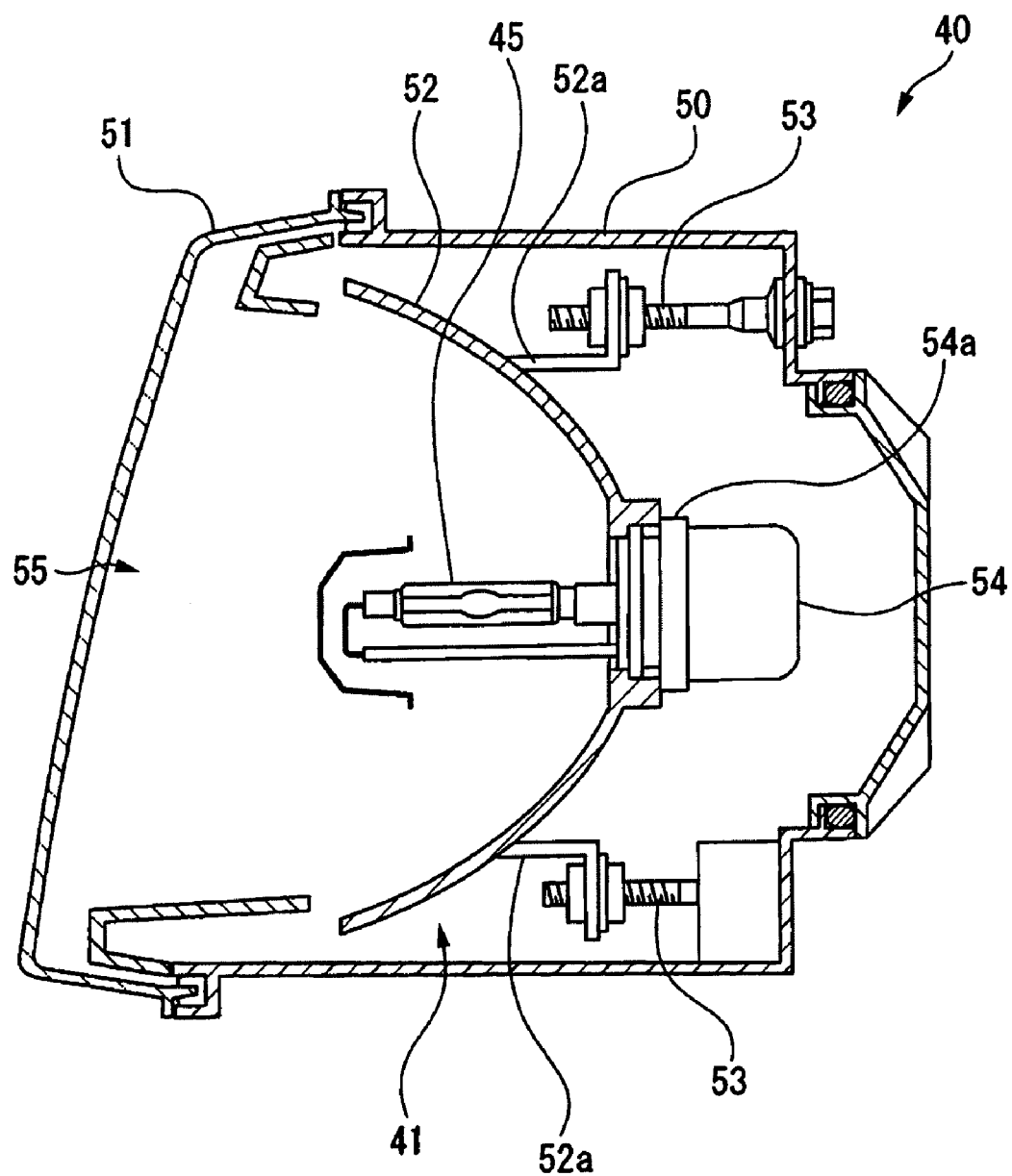
FIG. 6 is a sectional view of the vehicular headlamp, taken along line VI-VI in FIG. 5.
Figure 7:
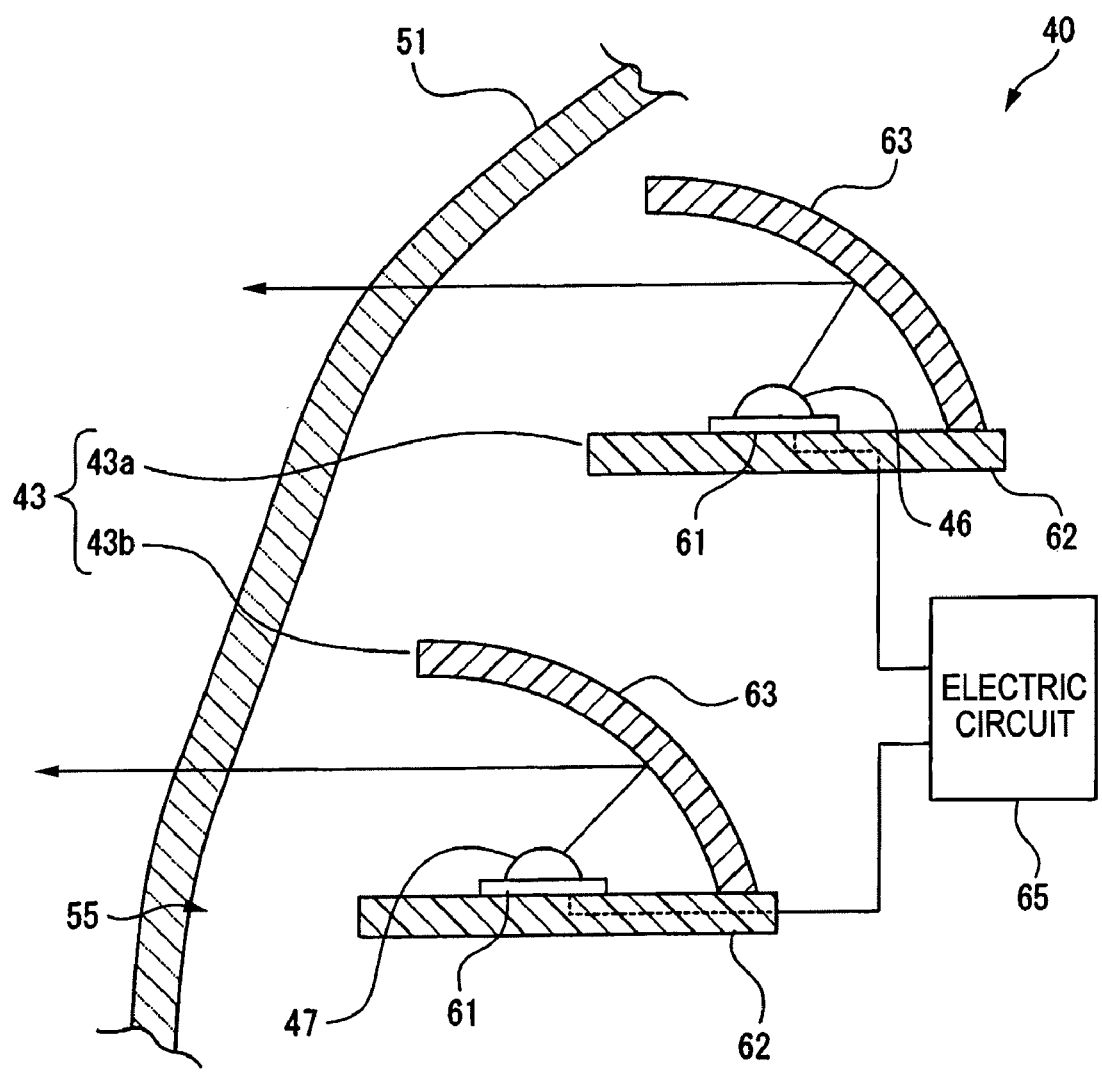
FIG. 7 is a sectional view of the vehicular headlamp, taken along line VII-VII in FIG. 5.

As shown in FIGS. 5-7, each vehicular headlamp 40 has a lamp housing 50 having a recess that is open on the front side and a cover 51 which closes the opening of the lamp housing 50. The internal space formed by the lamp housing 50 and the cover 51 is a lamp chamber 55.

As shown in FIG. 5, a headlamp unit 41 and an indication lamp unit 42 are disposed in the lamp chamber 55. The indication lamp unit 42 is provided with a daytime running lamp 43 and a turn signal lamp 44. The headlamp unit 41, the daytime running lamp 43, and the turn signal lamp 44 are provided with an LED 45, LEDs 46 and 47, and an LED 48, respectively.

As shown in FIG. 6, the headlamp unit 41 is configured in such a manner that a reflector 52, the light source 45 which is attached to the reflector 52, and other elements are provided in the lamp chamber 55.

The inside surface of the reflector 52 is a reflection surface. Top and bottom portions of the reflector 52 are provided with respective support subject members 52a which project backward.

The reflector 52 is connected to the lamp housing 50 by two link members 53. Front end portions of the link members 53 are connected to the support subject members 52a, respectively, and rear end portions of the link members 53 are connected to the lamp housing 50.

A rear end portion of the reflector 52 is formed with a light source attachment hole, and the light source 45 is attached to the perimeter of the light source attachment hole. The light source 45 has a base 54 which has a flange 54a.

As shown in FIG. 7, the daytime running lamp 43 comprises a first light source unit 43a on an upper side and a second light source unit 43b on a lower side. The first light source unit 43a is provided with a reflector 63 which is open on the front side, a horizontal substrate mounting member 62 which is attached to the read end of the reflector 63, a substrate 61 which is mounted on the substrate mounting member 62, and an LED 46 which is mounted on the substrate 61. The second light source unit 43b is provided with a reflector 63 which is open on the front side, a horizontal substrate mounting member 62 which is attached to the read end of the reflector 63, a substrate 61 which is mounted on the substrate mounting member 62, and an LED 47 which is mounted on the substrate 61.

Figure 8:
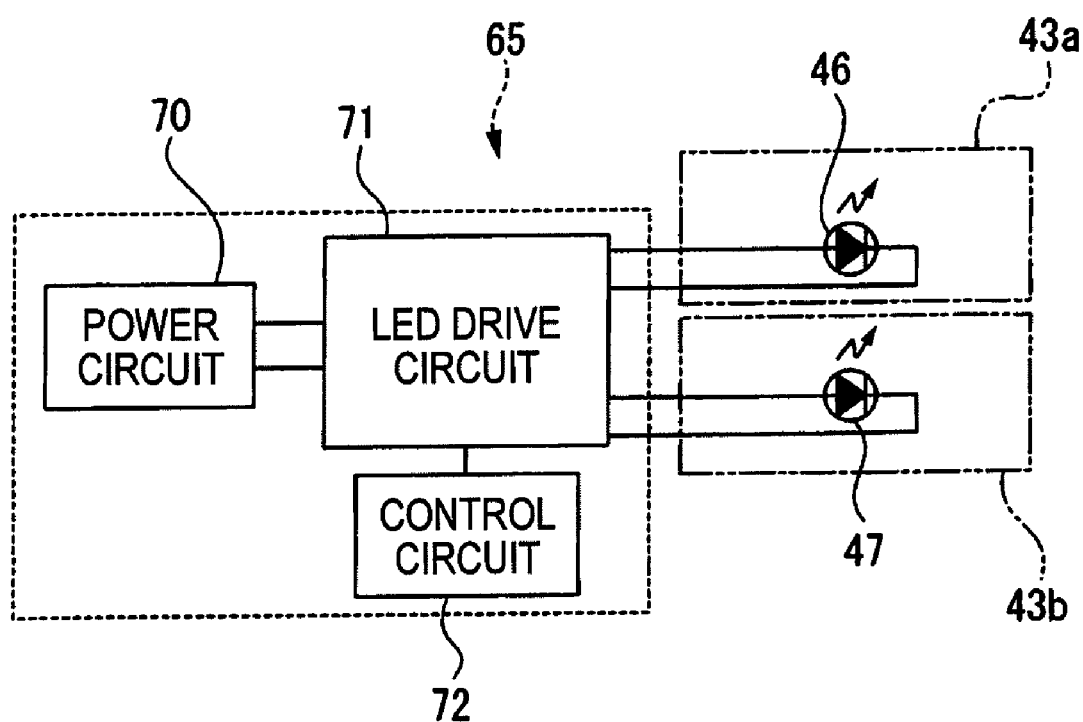
FIG. 8 is a schematic view illustrating control of current supply to LEDs.

An electric circuit 65 is coupled to the LEDs 46 and 47 of the indication lamp unit 43 and the light source 45 of the headlamp unit 41. As shown in FIG. 8, the electric circuit 65 is equipped with a power circuit 70, an LED drive circuit 71, and a control circuit 72. The power circuit 70, the LED drive circuit 71, and the control circuit 72 are the same as the power circuit 30, the LED drive circuit 31, and the control circuit 32 of the first exemplary embodiment and hence will not be described in detail.

The control circuit 72 which controls the LED drive circuit 71 will be described below.

The control circuit 72 controls the LED drive circuit 71 so that the current (hereinafter referred to as "third current") flowing through the LED 46 is made smaller than the current (hereinafter referred to as "fourth current") flowing through the LED 47. That is, by controlling the LED drive circuit 71, the control circuit 72 controls the first light source unit 43a and the second light source unit 43b individually.

Heat generated in the second light source unit 43b and heat generated while the headlamp unit 41 is lit tend to be transmitted upward. Therefore, the region that is occupied by the first light source unit 43a and is a top portion of the lamp chamber 55 becomes a high-temperature region. Therefore, the first light source unit 43a which is disposed in the high-temperature region is made higher in temperature than the lower region and hence is more prone to be affected by heat generated in the second light source unit 43b.

Furthermore, being in close proximity to the headlamp unit 41, the first light source unit 43a is more prone to be affected by heat generated in the headlamp unit 41 than the second light source unit 43b is.

However, in the vehicular headlamp 40, since the control circuit 72 performs control so that the third current flowing through the LED 46 is made smaller than the fourth current flowing through the LED 47, the degree of influence of heat generated in the headlamp unit 41 on the first light source unit 43a can be lowered. And the durability of the upper, first light source unit 43a which is disposed in close proximity to the headlamp unit 41 can thus be increased.

Although in the example of FIG. 5 the upper, first light source unit 43a is provided with the one LED 46 and the lower, second light source unit 43b is provided with the one LED 47, two or more LEDs may be provided in each of the first light source unit 43a and the second light source unit 43b.

According to exemplary embodiments of the present invention, a vehicular headlamp is provided. The vehicle headlamp unit is equipped with a headlamp unit which emits light forward, an indication lamp unit comprising a plurality of semiconductor light-emitting elements as light sources, and an electric circuit which supplies a current to at least the indication lamp unit, wherein the indication lamp unit is divided into at least two light source sections having respective sets of light sources, and at least one of the light source sections is disposed in a high-temperature region where temperature is made higher than in the other light source section while the headlamp unit is lit; and the electric circuit controls the light source sections individually so that a current supplied to the light source section disposed in the high-temperature region is made smaller than a current supplied to the light source section disposed in the other region.

Therefore, the current supplied to the light source section disposed in the high-temperature region among the at least two light source sections of the indication lamp unit is smaller than the current supplied to the other light source section.

Accordingly, a degree of influence on the indication lamp unit of heat generated in the headlamp unit can be lowered, whereby the light sources of the light source unit disposed in the high-temperature region can be protected.

Additionally, the electric circuit may control the divisional light source sections individually so that a current supplied to a light source section that is in close proximity to the headlamp unit is made smaller than a current supplied to the other light source section. Therefore, the degree of influence of heat generated in the headlamp unit on the indication lamp unit can be lowered, whereby the light sources of the light source section that is in close proximity to the headlamp unit can be protected.

At least one light source section may be disposed in a corner portion of a vehicle, and the electric circuit may control the light source sections individually so that a current supplied to the light source section that is disposed in the corner portion of the vehicle is made smaller than a current supplied to the other light source section. Therefore, a degree of influence of heat generated in the headlamp unit on the indication lamp unit can be lowered, whereby the light sources of the light source section that is disposed in the corner portion of the vehicle can be protected.

Moreover, at least one light source section may be disposed above the other light source section, and the electric circuit controls the light source sections individually so that a current supplied to the light source section that is disposed above the other light source section is made smaller than a current supplied to the other light source section. Therefore, a degree of influence of heat generated in the headlamp unit on the indication lamp unit can be lowered, whereby the light sources of the upper light source section can be protected.

The electric circuit may also control so as to turn off all the light sources when a line becomes disconnected in at least one of the light source sections. Therefore, a waste of power consumption can be prevented when a line becomes disconnected in at least one of the light source sections.

Furthermore, the indication lamp unit may also include a daytime running lamp which exercises an indication function when lit in a period other than night. The daytime running lamp makes it possible to extend the life of the light sources of the daytime running lamp which is in many cases lit continuously in a period other than night.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vehicular headlamp comprising:
a headlamp unit which emits light;
an indication lamp unit comprising a plurality of semiconductor light-emitting elements as light sources; and
an electric circuit which supplies a current to at least the indication lamp unit,
wherein the indication lamp unit is divided into at least two light source sections, each of the light source sections comprising at least one light source, and at least one of the light source sections is disposed in a high-temperature region whose temperature is made higher than in a remainder of the at least two light source sections while the headlamp unit is lit,
wherein the electric circuit controls the at least two light source sections individually so that a current supplied to the light source section disposed in the high-temperature region is made smaller than a current supplied to the remainder of the at least two light source sections.

2. The vehicular lamp according to claim 1, wherein the electric circuit controls the light source sections individually so that a current supplied to a light source section that is in close proximity to the headlamp unit is made smaller than a current supplied to other light source sections of the at least two light source sections.

3. The vehicular lamp according to claim 1, wherein at least one light source section is disposed in a corner portion of a vehicle, and
wherein the electric circuit controls the light source sections individually so that a current supplied to the light source section that is disposed in the corner portion of the vehicle is made smaller than a current supplied to the other light source sections of the at least two light source sections.

4. The vehicular lamp according to claim 1, wherein at least one of the at least two light source sections is disposed above the remainder of the at least two light source sections, and
wherein the electric circuit controls the at least two light source sections individually so that a current supplied to the at least one light source section that is disposed above the remainder is made smaller than a current supplied to the remainder.

5. The vehicular lamp according to claim 1, wherein the electric circuit performs control so as to turn off all the light sources when an abnormality has occurred in at least one of the light source sections.

6. The vehicular lamp according claim 1, wherein the indication lamp unit comprises a daytime running lamp which exercises an indication function when lit in a period other than night.

7. A headlamp for a vehicle, the headlamp comprising:
a headlamp unit which is configured to emit light;
a plurality of semiconductor light-emitting elements as light sources, at least one of the light sources disposed at a high-temperature position whose temperature is made higher than a temperature of other positions at which the remaining light sources are disposed when the headlamp unit is emitting light; and
a control circuit which is connected to the plurality of light sources to supply current to the light sources, and which controls the current supplied to the at least one light source at the high-temperature position to be smaller than the current supplied to the remaining light sources at the other positions.

8. The headlamp according to claim 7, wherein the control circuit controls the light sources individually so that a current supplied to a light source that is in close proximity to the headlamp unit is made smaller than a current supplied to the remaining light sources.

9. The headlamp according to claim 7, wherein at least one light source is disposed in a corner portion of a vehicle, and
wherein the control circuit controls the light sources individually so that a current supplied to the light source that is disposed in the corner portion of the vehicle is made smaller than a current supplied to the remaining light sources.

10. The headlamp according to claim 7, wherein at least one light source is disposed above the remaining light sources, and
wherein the control circuit controls the light sources individually so that a current supplied to the at least one light source that is disposed above the remaining light sources is made smaller than a current supplied to the remaining light sources.

11. The headlamp according to claim 7, wherein the control circuit performs control so as to turn off all the light sources when an abnormality has occurred in at least one light source.

12. The headlamp according claim 7, wherein the light sources are used as a daytime running lamp which exercises an indication function when lit in a period other than night.

13. The headlamp according to claim 7, wherein the high-temperature position is a position which is closer to the headlamp unit than the other positions.

14. A vehicle headlamp comprising:
a headlamp unit which emits light;
an indication lamp unit comprising a first light source section and a second light source section, the first light source section comprising at least one first light emitting diode (LED) and the second light source section comprising at least one second LED; and
an electric circuit which is connected to and supplies current to the at least one first LED and the at least one second LED,
wherein the first light source section is positioned closer to the headlamp unit than the second light source section, and
the electronic circuit controls the current to the first light source section and the second light source section individually, such that a current supplied to the at least one first LED of the first light source section is smaller than a current supplied to the at least one second LED of the second light source section.

* * * * *